(12) United States Patent
Agarwal et al.

(10) Patent No.: US 8,369,529 B1
(45) Date of Patent: *Feb. 5, 2013

(54) RE-KEYING BASED ON PRE-GENERATED KEYS

(75) Inventors: Vaibhave Agarwal, Sunnyvale, CA (US); Rajamohan Ganhasri, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,378

(22) Filed: Jul. 1, 2011

Related U.S. Application Data

(63) Continuation of application No. 11/926,853, filed on Oct. 29, 2007, now Pat. No. 7,983,423.

(51) Int. Cl.
H04L 9/08 (2006.01)
(52) U.S. Cl. ........................................................ 380/278
(58) Field of Classification Search .................. 380/278
See application file for complete search history.

(56) References Cited

U.S. PATENT DOCUMENTS

| | | | |
|---|---|---|---|
| 1,310,719 A | 7/1919 | Vernam | |
| 4,262,329 A | 4/1981 | Bright et al. | |
| 4,558,176 A | 12/1985 | Arnold et al. | |
| 4,757,533 A | 7/1988 | Allen et al. | |
| 5,185,717 A | 2/1993 | Mori | |
| 5,235,641 A | 8/1993 | Nozawa | |
| 5,265,159 A | 11/1993 | Kung | |
| 5,495,533 A | 2/1996 | Linehan et al. | |
| 5,677,952 A | 10/1997 | Blakley, III et al. | |
| 5,687,237 A | 11/1997 | Naclerio | |
| 5,870,468 A | 2/1999 | Harrison | |
| 5,931,947 A | 8/1999 | Burns | |
| 5,933,498 A | 8/1999 | Schneck et al. | |
| 5,940,507 A | 8/1999 | Cane | |
| 6,073,237 A | 6/2000 | Ellison | |
| 6,134,660 A | 10/2000 | Boneh et al. | |
| 6,212,600 B1 | 4/2001 | Friedman et al. | |
| 6,249,866 B1 | 6/2001 | Brundrett | |
| 6,345,101 B1 | 2/2002 | Shukla | |
| 6,356,941 B1 | 3/2002 | Cohen | |
| 6,405,315 B1 | 6/2002 | Burns et al. | |
| 6,414,884 B1 | 7/2002 | DeFelice et al. | |
| 6,507,911 B1 | 1/2003 | Langford | |
| 6,550,011 B1 | 4/2003 | Sims, III | |
| 6,625,734 B1 | 9/2003 | Marvit et al. | |
| 6,735,693 B1 | 5/2004 | Hamlin | |
| 6,754,827 B1 | 6/2004 | Cane et al. | |
| 6,839,437 B1 | 1/2005 | Crane et al. | |
| 6,857,076 B1 | 2/2005 | Klein | |
| 6,915,435 B1 | 7/2005 | Merriam | |
| 6,993,661 B1 | 1/2006 | Garfinkel | |
| 7,003,674 B1 | 2/2006 | Hamlin | |
| 7,020,779 B1 | 3/2006 | Sutherland | |

(Continued)

OTHER PUBLICATIONS

Anderson et al., "The Steganographic File System," Information Hiding, Second International Workshop, IH '98 Portland, Oregon. USA, Apr. 14-17, 1998, Proceedings, pp. 73-82, 1998.

(Continued)

*Primary Examiner* — Kambiz Zand
*Assistant Examiner* — Teshome Hailu
(74) *Attorney, Agent, or Firm* — Stephany DeBlois

(57) ABSTRACT

A system and method for pre-generating encryption keys for re-keying stored ciphertext. The encryption keys are illustratively distributed to LKMs and therefrom to the security appliances communicating with each other. A minimum number of un-used pre-generated encryption keys is established wherein when that number is reached more pre-generated encryption keys are created and distributed.

16 Claims, 5 Drawing Sheets

U.S. PATENT DOCUMENTS

| | | | |
|---|---|---|---|
| 7,089,424 B1 | 8/2006 | Subbiah | |
| 7,093,127 B2 | 8/2006 | McNulty et al. | |
| 7,096,355 B1 | 8/2006 | Marvit et al. | |
| 7,206,748 B1 | 4/2007 | Gruse et al. | |
| 7,215,771 B1 | 5/2007 | Hamlin | |
| 7,240,197 B1 | 7/2007 | Yamagami et al. | |
| 7,260,724 B1 | 8/2007 | Dickinson et al. | |
| 7,266,699 B2* | 9/2007 | Newman et al. | 713/182 |
| 7,729,496 B2* | 6/2010 | Hacigumus | 380/277 |
| 7,840,810 B2* | 11/2010 | Eastham | 713/171 |
| 7,983,423 B1* | 7/2011 | Agarwal et al. | 380/278 |
| 8,108,670 B2* | 1/2012 | Morgan et al. | 713/158 |
| 2002/0013898 A1 | 1/2002 | Sudia et al. | |
| 2003/0028765 A1 | 2/2003 | Cromer et al. | |
| 2004/0030668 A1 | 2/2004 | Pawlowski et al. | |
| 2006/0179309 A1* | 8/2006 | Cross et al. | 713/168 |
| 2006/0236104 A1* | 10/2006 | Wong et al. | 713/168 |
| 2007/0201700 A1* | 8/2007 | Hacigumus | 380/277 |
| 2008/0063210 A1* | 3/2008 | Goodman et al. | 380/286 |
| 2008/0122553 A1* | 5/2008 | McKinzie | 333/17.3 |
| 2008/0301470 A1 | 12/2008 | Green et al. | |

OTHER PUBLICATIONS

Antonelli, et al., "The Packet Vault: Secure Storage of Network Data," CITI Technical Report 98-5, pp. 1-15, Jun. 25. 1998.

Blaze, "Oblivious Key Escrow," Information Hiding, First International Workshop, Cambridge, UK, May 3-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of the FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes," IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS PUB 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 43 and 65-67, Jan. 1995.

Garfinkel, S., "PGP: Pretty Good Privacy," O'Reilly & Associates, pp. 54-55, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report Cmu-Cs-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21. 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).

Hwang, et al., "An Access Control Scheme Based on Chinese Remainder Theorem and Time Stamp Concept," Computers & Security, vol. 15. No. 1. pp. 73-81,1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM Integrated Cryptographic Coprocessors for IBM eServer zSeries 900 and for IBM S/390 Servers (Data sheet), 2000, 4 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1, 1997, 8 pages.

Menezes et al., "Handbook of Applied Cryptography," CRC Press, Section 13.7.1, 4 pages, 1997.

Moore, "Preventing Access to A Personal Computer," IBM Technical Disclosure Bulletin, pp. 98-100, Sep. 1992.

Omniva Policy Systems, www.omniva.com (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7, Feb. 8, 2000.

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AIEE, pp. 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

* cited by examiner

RE-KEYING BASED ON PRE-GENERATED KEYS

RELATED APPLICATIONS

This application is a continuation of U.S. patent application Ser. No. 11/926,853, filed on Oct. 29, 2007, entitled a RE-KEYING BASED ON PRE-GENERATED KEYS, by Vaibhave Agarwal et al., which is hereby incorporated by reference.

FIELD OF THE INVENTION

The present invention relates to secure storage in a storage system, and more specifically, to generation and control of encryption keys used by secure systems

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

Herein the term "client" and "host" are used interchangeably.

Where the information is organized as files, the client requesting the information, typically, maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun (logical unit number).

Each cryptainer is associated with its own encryption key, e.g., a cryptainer key, which is used by the security appliance to encrypt and decrypt the data stored on the cryptainer. An encryption key is a code or number which, when taken together with an is encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

In some systems encrypted data stored on a disk block (or other cryptainer) is often re-keyed, that is re-encrypted, according to a policy. If, for example, the policy may dictate that if an encryption key is compromised, the data may not be secure and must be re-keyed or re-encrypted. The policy may also dictate that, as a matter of common practice, data might be regularly re-encrypted on a time basis. For example, for critical information the data may be re-encrypted every day or week or month, whereas other data may be re-encrypted over longer time periods, e.g., every year. Herein re-keying involves reading and decrypting ciphertext data with the old key to yield clear data, and then re-encrypting the clear data with a new encryption key and restoring the data to the storage medium. Policy also includes "re-keying" a disk that initially contains clear text. Here the clear text is read, encrypted with a key and the ciphertext is written back onto the disk.

In some systems the security appliance performs the encryption and decryption, and, in addition, the security appliance may control access to both the storage and the client or authentication, where only "secure known" clients are served. The security appliance is the proxy for both the client and the storage system. That is the security appliance appears as the storage system to the client and appears as the client to the storage system. Additionally, re-keying is also handled by the security appliance, where the security appliance manages the key(s) and the block(s) associated with each key. In known systems each file may be encrypted with a given key and the file and the key are stored and tracked by the security appliance using a file system to manage all the file keys.

The security appliance logs and tracks the activities for a large number of different clients, a large number of different file blocks, a large number of different encryption keys that must be generated and implemented, and a large number of different storage systems. The security appliance store the policy governing such re-keying while tracking a very large number of new keys and corresponding very large number of blocks being re-keyed. The security appliance interacts with the storage system to reserve space and to initiate reads and writes to that space, and it ensures that there is no interference among the clients, files, keys, and storage systems.

In the known security systems, when data is to be re-keyed, a new key is generated "on the fly," or when the key is needed in real time. This new key must then be distributed to other security appliances, lifetime key management (LKM) servers, and associated back-up and tracking facilities. This management/maintenance function may impact the performance of the security system.

SUMMARY OF THE INVENTION

The present invention addresses limitations in the known systems by pre-generating encryption keys. The security appliance generates a particular number of keys. These keys are then sent to a LKM, which then distribute them to other security appliances for virtually immediate use. The keys don't overlap among security appliances, unless they are in the same cluster. A number is also created and distributed to the security appliances and LKMs that represents the minimum number of unused pre-generated encryption keys. When that number is reached it triggers the creation of additional pre-generated encryption keys.

Illustratively a re-keying policy is defined and stored within the security appliances. That policy includes, for example, when an encryption key may have been compromised, when a time limit on the use of a key has been reached, and when the stored data is clear text.

When a re-keying command is issued, the targeted security appliance will read the targeted ciphertext from the storage system and use the old key to decrypt to create clear text. A pre-generated key is retrieved and used to encrypt the clear text forming a new ciphertext. That ciphertext is then re-written back onto the storage system. The newly used encryption key is then communicated to the LKMs, wherein they update their record of unused pre-generated encryption keys and the number that are used. LKM server can communicate the rekeyed cryptainer key to other security appliances in case they are using the same cryptainer.

When a security appliance uses a pregenerated encryption key and finds that the number of unused pre-generated encryption keys has reached the minimum, that security appliance creates new unused pre-generated encryption keys. These newly created keys are then distributed to the other security appliances and LKMs.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN
ILLUSTRATIVE EMBODIMENT

The present invention pre-generates encryption keys in security appliances and sends them to LKMs associated with the security appliance. The LKM distributes these keys with no overlap and for immediate use to other security appliances. A minimum number of unused pre-generated keys are always kept available with new ones generated when the minimum number is reached.

Figure 1A:
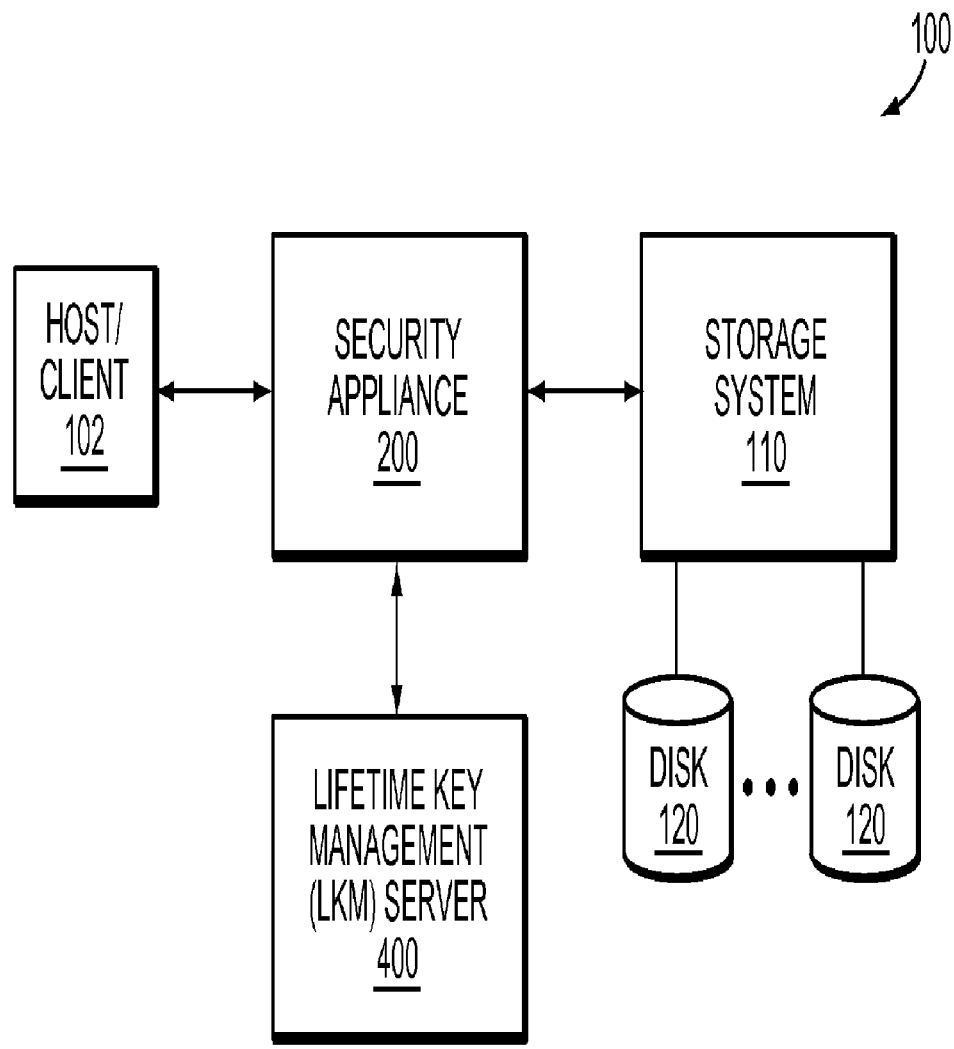
FIG. 1A is a schematic block diagram of an environment including a multi-protocol security appliance that may be advantageously used with the present invention.

FIG. 1 is a schematic block diagram of an environment 100 including a multi-protocol security appliance 200 that may be advantageously used with the present invention. The security appliance 200 is coupled between one or more clients 102 and one or more storage systems 110, such as an application server or filer. The security appliance 200 intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a highquality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. The security appliance, in addition to encrypting and decrypting, addresses the storage system 110, provides authentication, secure-logging and "virtualization." Virtualization refers to the security appliance appearing as if it were the storage system to the client, while appearing as if it were the client to the storage system.

A lifetime key management (LKM) server 400 is configured to manage all encryption keys used by the security appliance 200 to encrypt and decrypt data securely stored on the storage system 110, ensuring encryption key availability for the life of the secured data. For example, the LKM server 400 receives encrypted cryptainer keys from the security appliance 200 and sends encrypted cryptainer keys on demand to the appliance. The LKM server is further configured to support a plurality of security appliances 200 such that, when a particular appliance encounters a data access request directed to a cryptainer for which it does not have the appropriate key, that appliance accesses the LKM server 400 to receive the appropriate key.

The clients may be running conventional operating system software, for example Windows, Unix, but other operating systems may be used, and, further, the operations may be implemented in hardware or firmware/hardware, etc. The protocol governing the communications between the clients and the security appliance may be XML, but others may be used.

Figure 2:
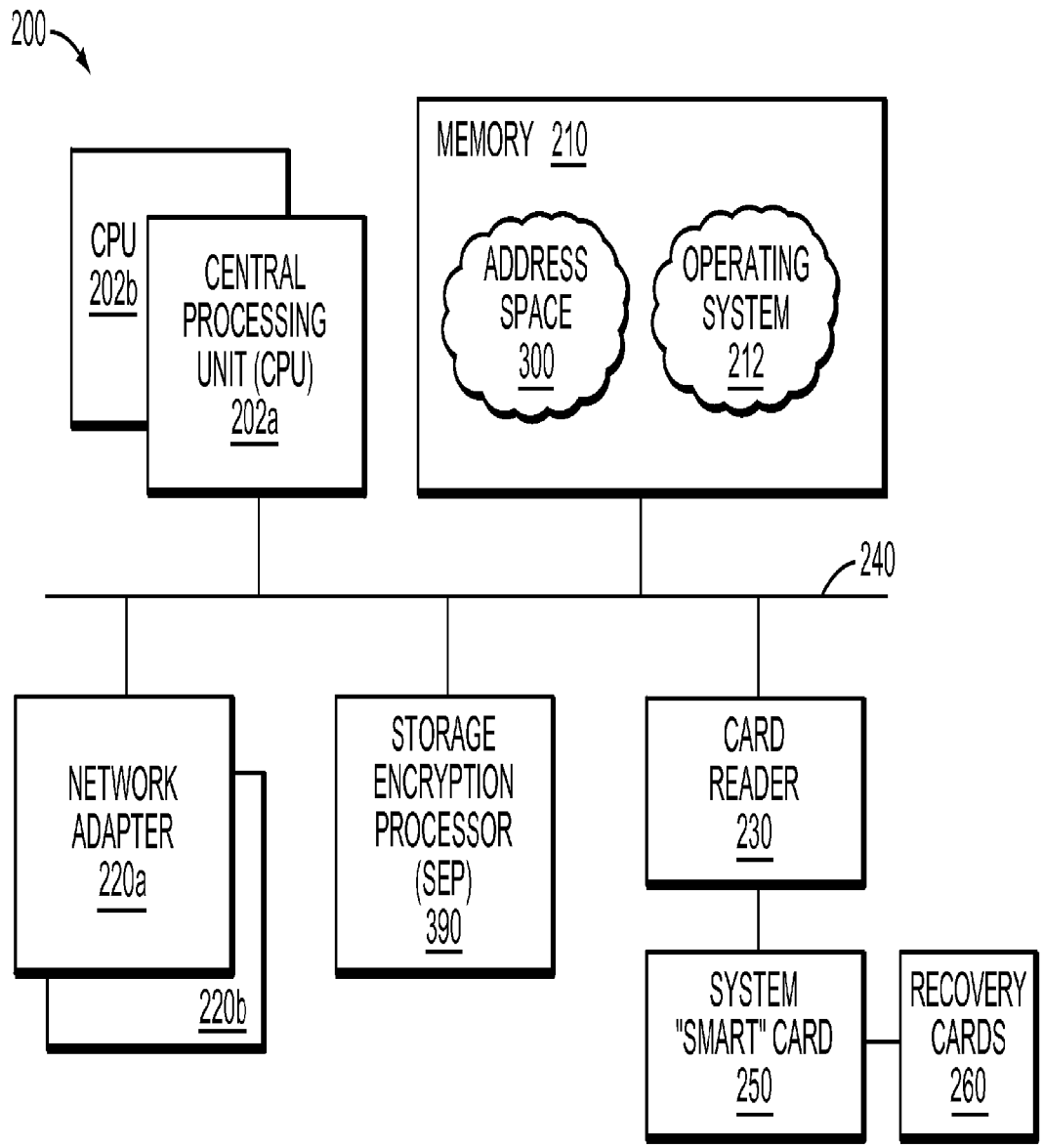
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients/hosts of network attached storage (NAS) and storage area network (SAN) deployments. The security appliance comprises one or more processors, e.g., central processing units (CPU 220a,b), a memory 210, one is or more network adapters 220a,b, and a storage encryption processor (SEP 390) interconnected by a system bus 240, such as a conventional Peripheral Component Interconnect (PCI) bus. The SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 level-3 certified module that is epoxy-potted onto a dedicated interface card or other similar card.

The SEP 390 illustratively implements the AES-256 encryption algorithm. However, in alternative embodiments, the SEP 390 may implement additional and/or differing encryption algorithms including, e.g., HMAC-SHA-512, deterministic random number generator (DRNG) using SHA-1, elliptic curve cryptography, etc.

The network adapters 220a,b couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network or a support computer system. In a NAS environment configured to support, e.g., the conventional Common Internet File System (CIFS) and the Network File System (NFS) data access protocols, the network adapters 220a,b may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipuis late the data structures. An operating system 212, portions of which are typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Since the SEP 390 protects encryption keys from being "touched" (processed) by the system software executing on the CPU 202, a mechanism is needed, at least initially to load keys into and retrieve keys from the SEP. To that end, the card reader 230 provides an interface between a "smart" system card 250 and SEP 390 for purposes of exchanging encryption keys. Illustratively, the system card is a FIPS 140-2 certified card that is configured with customized software code. As described further below, a portion of the cryptographic information, needed to initialize the security appliance, is stored on the system card 250, thereby preventing the initialization of the appliance 200 without the presence of the card 250. The security appliance (and card reader 230) are further configured to support additional smart cards 260.

Operationally, encryption keys are exchanged between the SEPs 390 and system card 250, where they are "secret shared" (cryptographically assigned) with the recovery cards 260 as recovery keys. These recovery keys can thereafter be applied (via the recovery cards) to the security appliance 200 to enable restoration of other encryption keys (such as cryptainer keys). A quorum setting for the recovery cards 260 may be provided such that the recovery keys stored on the recovery cards are backed up in a threshold scheme whereby, e.g., any 2 of the 5 default cards can recover the keys. The use of these recovery cards may be referred to herein as activities performed by recovery officers, since the recovery cards are controlled by humans.

The operating system 212 illustratively organizes the memory 210 into an address space arrangement available to the software processes and modules executing on the is processors.

Figure 3:
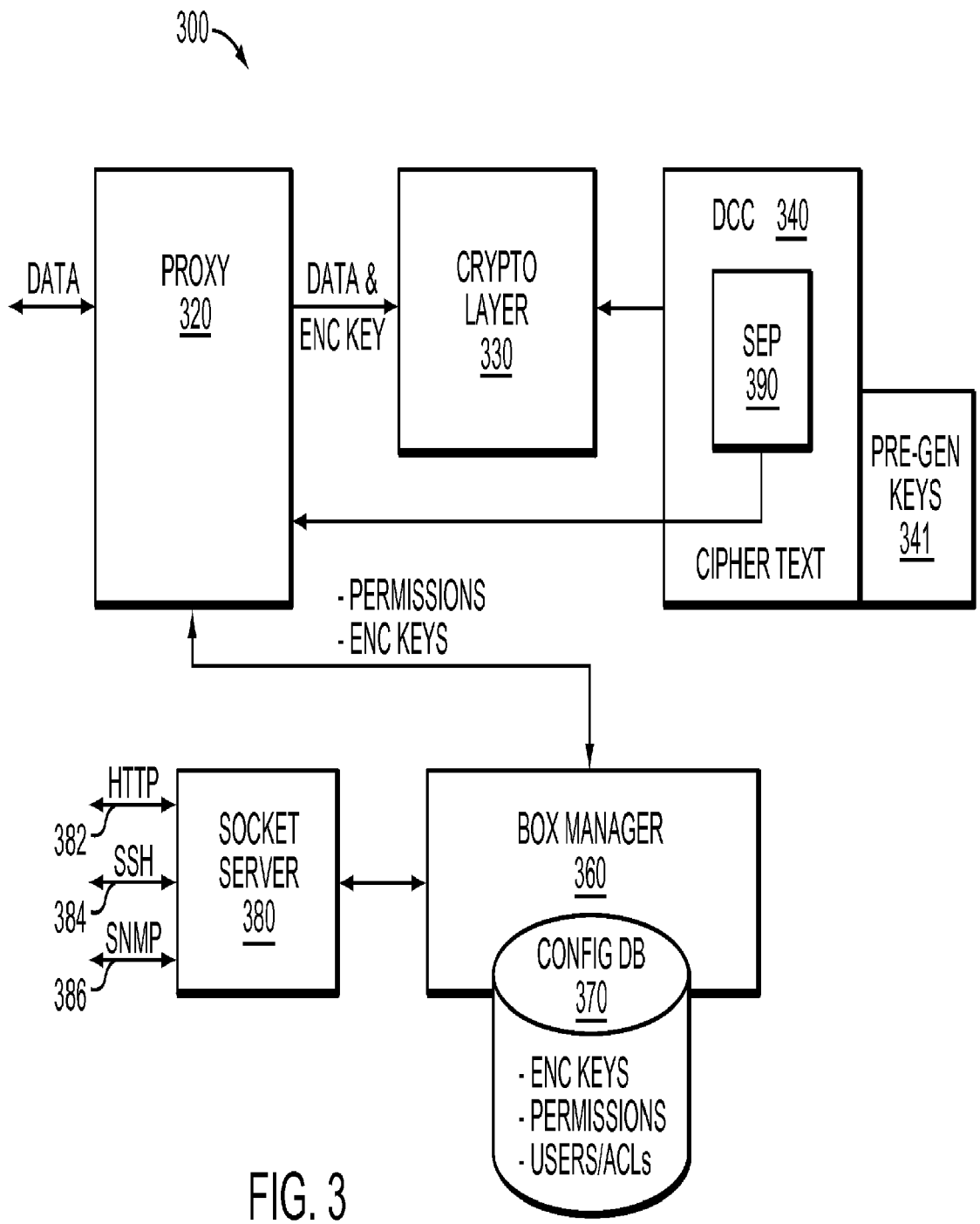
FIG. 3 is a schematic diagram illustrating an arrangement of software processes and modules executing on the security appliance in accordance with the present invention.

FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be used.

For both NAS and SAN environments, data is received at a proxy 320 of the security appliance. The proxy 320 is a module embodied as, e.g., the network protocol stack configured to interpret the protocol over which data is received and to enforce certain access control rules based on one or more policies. Each policy is served by a box manager 360. The box manager 360 is illustratively embodied as a database application process configured to manage a configuration repository or database (ConfigDB 370) that stores system-wide settings and encryption keys. A socket server 380 provides interfaces to the box manager 360, including (i) an HTTP web interface 382 embodied as, e.g., a graphical user interface (GUI) adapted for web-based administration, (ii) an SSH interface 384 for command line interface (CLI) command administration, and (iii) and SNMP interface 386 for remote management and monitoring.

Specifically, the box manager 360 supplies permissions and encryption keys to the proxy 320, which intercepts data access requests and identifies the source (clients 102) of the those requests, as well as the types of requests and the storage targets (cryptainer) of those requests. The proxy also queries the box manager for permissions associated with each client/host and, in response, the box manager 360 supplies the appropriate permissions and encryption key (e.g., a cryptainer key). The proxy 320 then bundles the data together with the encryption key and forwards that information to a crypto layer 330.

The crypto layer 330 interacts with the DCC 340 (Data Crypto Card) by accessing (reading and writing) registers on the DCC and, to that end, functions as a system bus interface to present the starting and ending points of data, as well as offsets into the data and the encrypted keys used to encrypt the data. Upon completion of encryption of the data, the DCC returns the encrypted data as ciphertext to the proxy 320, which forwards is the encrypted data to the storage system 110.

Pre-generated encryption keys 341 are stored with the SEP 390. These keys were generated by a command of a system administrator during initial set up of the system. Software is executed to generate encryption keys, that are then distributed to all the security appliances in communications with each other. There is a trigger based on the number of keys remaining that are unused. When that number is reached, new keys are generated and distributed when time allows. In this way system performance is not affected.

Figure 4:
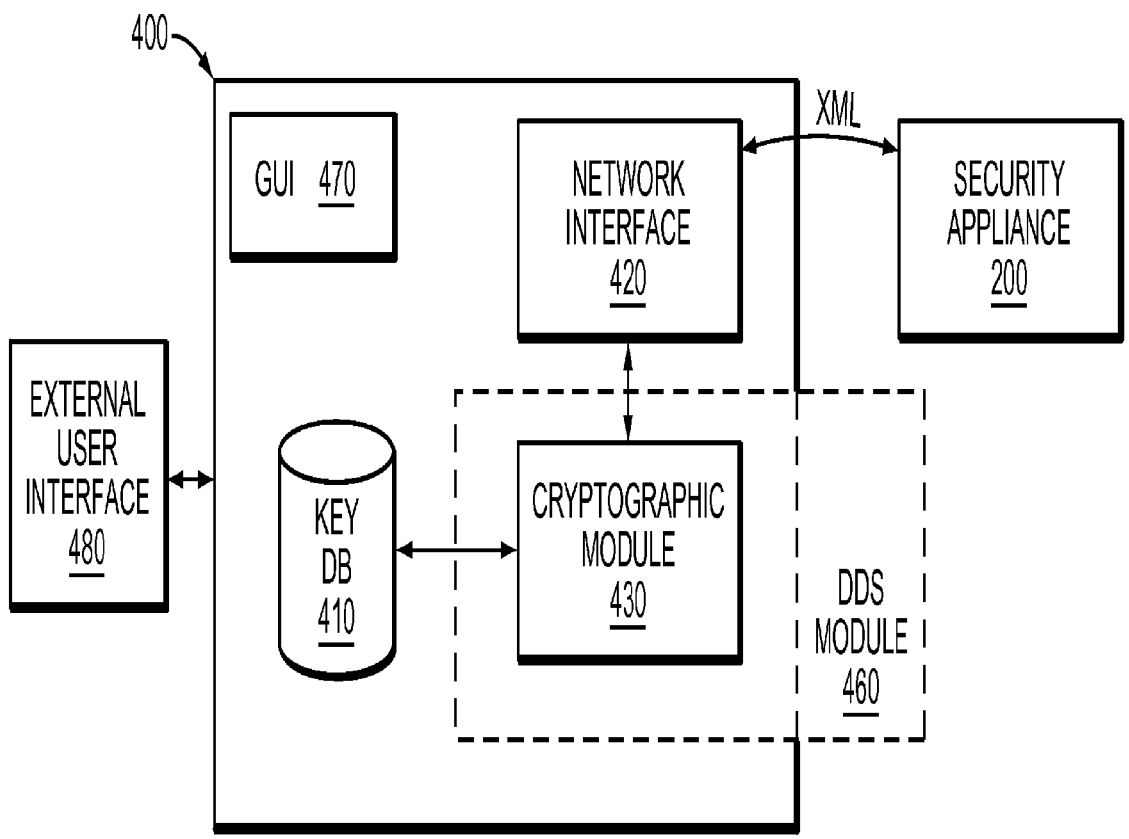
FIG. 4 is a schematic block diagram of a lifetime key management (LKM) server that may be advantageously used with the present invention.

FIG. 4 is a schematic block diagram of the LKM server 400 that may be advantageously used with the present invention. The LKM server may be illustratively embodied as software running on a machine, such as a computer executing, e.g., the conventional Windows operating system. However, it will be understood to those of skill in the art that the LKM server could also be embodied as hardware. The LKM 400 includes a key database 410, which is illustratively a relational database (e.g., a conventional SQL database) or other database configured to store keys that are in use by one of the security appliances. However, in addition, the unused pre-generated keys may also be stored in the key DB 410 in a separate area.

A network interface 420 provides connections to all security appliances 200 that utilize the LKM server. The LKM 400 illustratively communicates with the security appliance 200 via a proprietary protocol, preferably based on XML. A cryptographic module 430 is configured to implement algorithms needed to perform cryptographic operations for the LKM.

An overlapping, data decryption software (DDS) module 460 "shares" the cryptographic module (e.g., its algorithms) on the LKM server. Illustratively, the function of the DDS 460 is to decrypt a piece of storage (e.g., a file) with an appropriate key to thereby enable recovery of the data contained in the file. To that end, the DDS functions as a data recovery software module. The LKM server 400 also includes a GUI 470 that provides a user with an interface to the functionality of the LKM and DDS 460. Alternatively, an external user interface 480 may run on a stand alone machine, such as a Windows management station, to provide GUI functionality for the LKM.

In the illustrative embodiment, the LKM 400 is embodied as an independent server that is coupled to one or more security appliances 200. When initializing a security appliance, a system administrator specifies the LKM 400 with which the appliance is to communicate. In addition, a trust relationship is established between the security appliance and the LKM using, e.g., a shared secret or certificate to establish a secure communication channel. Note that storage of the key on the key database 410 is primarily for redundancy/backup of the key to thereby reduce the chances of data loss for information protected by the key.

In accordance with an aspect of the invention, the client/host enforces one or more policies that may include re-writing ciphertext. For example, a key has been compromised, or if a time limit attribute of a key has expired, policy may instruct the client/host to re-write (re-key) a group or all the blocks of a storage system. In response, the client host issues a re-write command to the security appliance, which generates new encryption keys. The stored ciphertext in the blocks is read and decrypted using the old keys and then re-encrypted using the new keys and written back into the same storage blocks. Thereafter, the old keys are deleted. The security appliance maintains a table or database that associates encryption keys with storage blocks.

In some systems, not shown, encryption keys are wrapped within another encrypted layer using a second encryption key. Such systems may be used advantageously with the present invention. Notably, a file key may be used to encrypt a data file, and a cryptainer key may be used to encrypt part of a metadata portion of the file. That is, each file key is encrypted and signed with the cryptainer key.

Figure 5:
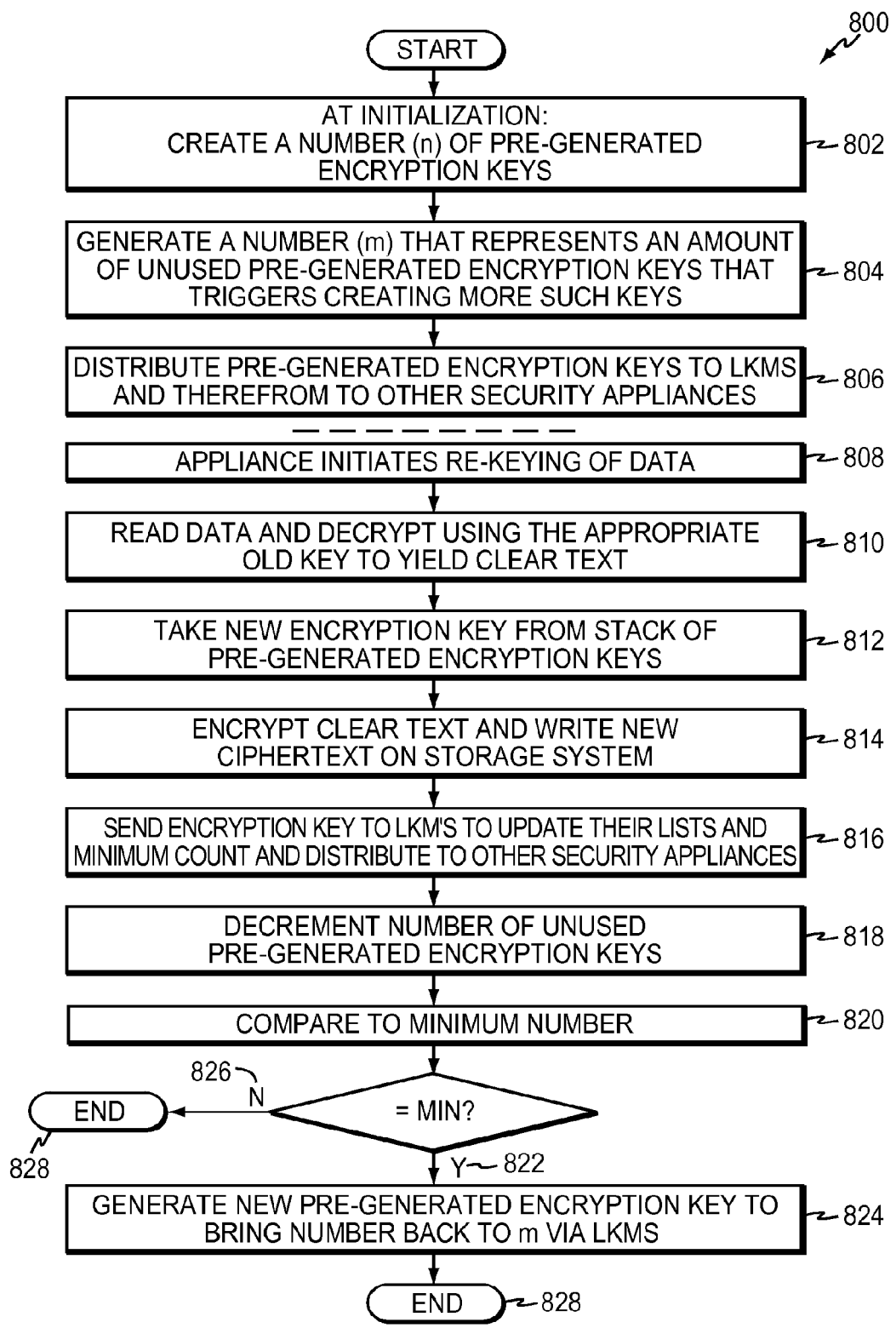
FIG. 5 is a flowchart illustrating pre-generating encryption keys and illustrating how those keys are used.

FIG. 5 is a flowchart illustrating a re-keying procedure 800 in accordance with the present invention. As mentioned above, a system is initialized by a system administrator after a trust relationship has been established among the system administrator, the security appliance and an LKM. Part of the initialization includes a security appliance creating a number "n" of pre-generated encryption keys 802, and distributing in step 806 those encryption keys to LKMs in communication with the generating security appliance, and from the LKMs to other security appliances. A second number "m" is created 804 and sent along with the pre-generated encryption keys. This second number "m" defines a minimum that when reached will cause the security appliance that reaches "m" to create additional pre-generated encryption keys. Illustratively, the number pre-generated encryption keys are restored to "n."

Specifically, the pre-generated list of encryption keys may be distributed 806 to LKMs that are in communications with the security appliance, and from those LKMs to other security appliances.

When a security appliance as directed by policy, initiates a re-keying 808, in step 810 the security appliance reads the stored ciphertext using the appropriate old key to yield clear text. The security appliance then removes an unused pre-generated key from a stack of pre-generated keys, encrypts the clear text and rewrites 814 the new ciphertext back onto the storage system. That used pre-generated encryption key is then sent 816 to the LKMs so they can update 816 their lists and minimum count. The LKMs then distribute the key to other security appliances. The number of unused pre-generated encryption keys is decremented 818 and compared 820 to the minimum number "m". If the minimum number is reached 822, that security appliance generates 824 a number of encryption keys bringing the number of pre-generated encryption keys back to the original amount "n," whereupon the process ends 828.

If the minimum "m" is not reached 826 the process ends 828.

As time is available, the newly created encryption keys are distributed by LKMs to 824 among the other security appliances, where the stack of pre-generated encryption keys and the count "n" is restored.

The above is presented as a series of process steps using stacks and count numbers, "n," and "m." Those skilled in the art will understand this process and details may be supplanted by many other techniques including using specific labels, designated areas of memory, etc., and that hardware and/or firmware may be used to advantage in other is applications.

The foregoing description has been directed to specific embodiments of this invention. It will be apparent; however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for re-keying data, comprising:
pre-generating encryption keys by a first security appliance of a plurality of security appliances before a re-key command is received at the first security appliance having a processor;
generating a minimum count of unused pre-generated encryption keys;
distributing the pre-generated encryption keys and the minimum count to a second security appliance of the plurality of security appliances;
storing the pre-generated encryption keys and the minimum count;
receiving the re-key command at the first security appliance to re-key a data container served by a storage system;
in response to receiving the re-key command, re-keying the data container with a pre-generated encryption key of the pre-generated encryption keys; and
generating, by at least one security appliance of the plurality of security appliances, additional pre-generated keys, wherein the additional pre-generated encryption keys are generated in response to reaching the minimum count.

2. The method of claim 1 further comprising:
distributing a list of the pre-generated encryption keys to a lifetime key management (LKM) server operatively connected to the plurality of security appliances; and
distributing the list to the second security appliance.

3. The method of claim 1 further comprising:
following a re-keying policy by the first security appliance.

4. The method of claim 3 wherein the re-keying policy comprises at least one of re-keying when a first encryption key is compromised and when the first encryption key is used for a set time that has elapsed.

5. The method of claim 1 further comprising:
in response to receiving the re-key command, reading by the first security appliance a ciphertext from the storage system;
using a previously generated encryption key previously used to form the ciphertext to create a clear text;
using the pre-generated encryption key to encrypt the clear text and form a new ciphertext; and
storing the new ciphertext at the storage system.

6. The method of claim 5 further comprising updating a record of one or more unused pre-generated encryption keys and one or more used pre-generated encryption keys.

7. The method of claim 1 further comprising communicating use of the pre-generated encryption keys to the second security appliance.

8. A system configured to re-key data, comprising:
a first security appliance of a plurality of security appliances configured to pre-generate an encryption key before a re-key command is received at the first security appliance having a processor, wherein the first security appliance distributes the pre-generated encryption key to a second security appliance;
at least one processor configured to generate a minimum count of unused pre-generated encrypted keys;
the first security appliance further configured to receive the re-key command to re-key a data container of the system;
the first security appliance further configured to, in response to receiving the re-key command, re-key the data container with the pre-generated encryption key; and
at least one other security appliance of the plurality of security appliances to generate an additional pre-generated key in response to reaching the minimum count.

9. The system of claim 8 wherein the first security appliance is further configured to distribute a list of pre-generated encryption keys to a server configured to communicate with the first security appliance.

10. The system of claim 8 wherein the first security appliance is further configured to follow a re-keying policy.

11. The system of claim 10 wherein the re-keying policy comprises at least one of re-keying when a first encryption key is compromised and when the first encryption key is used for a set time that has elapsed.

12. The system of claim 8 wherein the first security appliance is further configured to:
read, in response to receiving the re-key command, a ciphertext from the system;
use a previously generated encryption key previously used to form the ciphertext to create a clear text; and
use the pre-generated encryption key to encrypt the clear text and form a new ciphertext.

13. The system of claim 12 wherein the first security appliance is further configured to update a record of one or more unused pre-generated encryption keys and one or more used pre-generated encryption keys.

14. The system of claim 8 wherein the first security appliance is further configured to communicate use of the pre-generated encryption key to the second security appliance.

15. A non-transitory computer-readable storage medium stored with executable program instructions for execution by a processor, the computer-readable storage medium comprising:
program instructions that pre-generate an encryption key by a first computer of a plurality of computers before a re-key command is received at the first computer;
program instructions that generate a minimum count of unused pre-generated encryption keys;
program instructions that distribute the generated key and the minimum count to a second computer of the plurality of computers;
program instructions that receive the re-key command at the first computer to re-key a data container served by the plurality of computers;
program instructions that, in response to receiving the re-key command, re-key the data container with the pre-generated encryption key; and
program instructions that generate, for at least one computer of the plurality of computers, additional pre-generated keys, wherein the additional pre-generated encryption keys are generated in response to reaching the minimum count.

16. The non-transitory computer-readable storage medium of claim 15 further comprising program instructions that, in response to re-keying the data container with the pre-generated encryption key, update a record of one or more unused pre-generated encryption keys and one or more used pre-generated encryption keys.

* * * * *

UNITED STATES PATENT AND TRADEMARK OFFICE
CERTIFICATE OF CORRECTION

PATENT NO. : 8,369,529 B1  
APPLICATION NO. : 13/175378  
DATED : February 5, 2013  
INVENTOR(S) : Vaibhave Agarwal et al.

Page 1 of 1

It is certified that error appears in the above-identified patent and that said Letters Patent is hereby corrected as shown below:

In the Specifications:

In col. 1, line 57 should read:  
Together with an ~~is~~ encryption algorithm, defines a unique In col. 4, line 13 should read:  
Illustratively uses a high-quality, software or hardware-based In col. 4, line 54 should read:  
Ing units (CPU 220$a,b$) a memory 210, one ~~is~~ or more net- In col. 5, line 27 should read:  
Ured to execute the software programs and ~~manipuis late~~manipulate the In col. 5, line 66 should read:  
The software processes and modules executing on the ~~is~~ pro- In col. 6, line 41 should read:  
Which forwards ~~is~~ the encrypted data to the storage system In col. 8, line 28 should read:  
Firmware may be used to advantage in other ~~is~~ applications.

Signed and Sealed this  
Eleventh Day of June, 2013

Teresa Stanek Rea  
*Acting Director of the United States Patent and Trademark Office*